Feb. 13, 1951  W. D. ORSER  2,541,014
ERECTOR LENS FOR LOW-POWER TELESCOPES
Filed Sept. 23, 1948

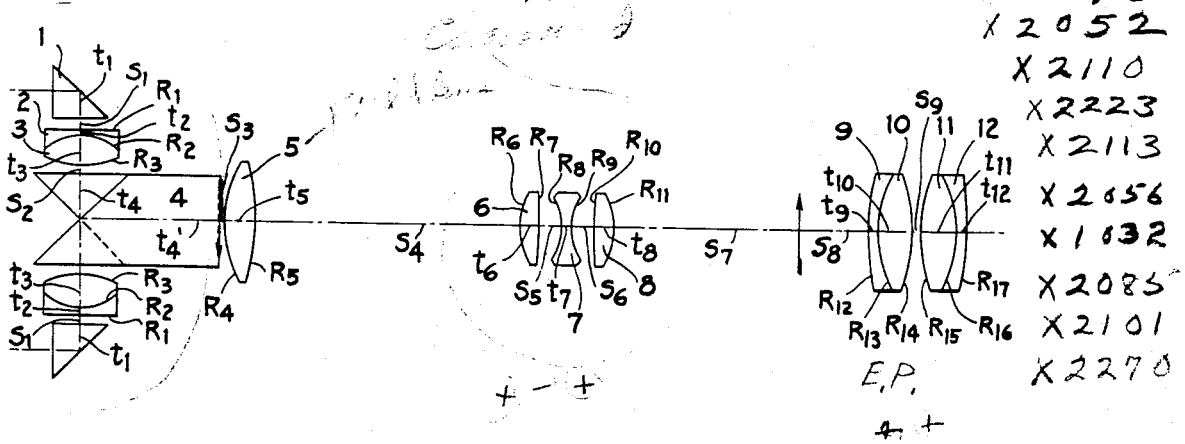

| LENS ELEMENT | N | V | RADII | THICKNESSES AND SPACES |
|---|---|---|---|---|
| 1 | 1.517 | 64.5 | PRISM | $t_1$ = 8.0 mm. |
|   |       |      |       | $S_1$ = 1.5 |
| 2 | 1.649 | 33.8 | $R_1$ = ∞ | $t_2$ = 1.0 |
| 3 | 1.572 | 57.4 | $R_2$ = + 8.25 mm. | $t_3$ = 5.0 |
|   |       |      | $R_3$ = − 9.98 | $S_2$ = 1.5 |
| 4 | 1.517 | 64.5 | PRISM | $t_4$ = 7.0 |
|   |       |      |       | $t_4'$ = 22.1 |
|   |       |      |       | $S_3$ = 0.3 |
| 5 | 1.517 | 64.5 | $R_4$ = + 18.96 | $t_5$ = 5.0 |
|   |       |      | $R_5$ = − 31.98 | $S_4$ = 41.6 |
| 6 | 1.697 | 56.1 | $R_6$ = + 10.40 | $t_6$ = 3.05 |
|   |       |      | $R_7$ = − 62.39 | $S_5$ = 3.35 |
| 7 | 1.649 | 33.8 | $R_8$ = − 9.15 | $t_7$ = 1.43 |
|   |       |      | $R_9$ = + 9.15 | $S_6$ = 3.35 |
| 8 | 1.697 | 56.1 | $R_{10}$ = + 62.39 | $t_8$ = 3.05 |
|   |       |      | $R_{11}$ = − 10.40 | $S_7$ = 35.9 |
|   |       |      |       | $S_8$ = 14.8 |
| 9 | 1.649 | 33.8 | $R_{12}$ = + 51.75 | $t_9$ = 1.24 |
| 10 | 1.517 | 64.5 | $R_{13}$ = + 17.42 | $t_{10}$ = 5.80 |
|   |       |      | $R_{14}$ = − 23.70 | $S_9$ = 0.50 |
| 11 | 1.517 | 64.5 | $R_{15}$ = + 23.70 | $t_{11}$ = 5.80 |
| 12 | 1.649 | 33.8 | $R_{16}$ = − 17.42 | $t_{12}$ = 1.24 |
|   |       |      | $R_{17}$ = − 51.75 |   |

OBJECTIVE $F_I$ = 20.08 mm. { elements 2, 3 }
FIELD LENS $F_{II}$ = 23.82 mm. { element 5 }
ERECTOR $F_{III}$ = 25.13 mm. { elements 6, 7, 8 }
EYEPIECE $F_{IV}$ = 19.76 mm. { elements 9, 10, 11, 12 }

WILLIAM DONALD ORSER
INVENTOR.

BY Newton M. Perrins
Harold F. Bennett
ATTORNEY & AGENT

Patented Feb. 13, 1951

2,541,014

UNITED STATES PATENT OFFICE 2,541,014

ERECTOR LENS FOR LOW-POWER TELESCOPES

William Donald Orser, Rochester, N. Y., assignor to Eastman Kodak Company, Rochester, N. Y., a corporation of New Jersey Application September 23, 1948, Serial No. 50,688

3 Claims. (Cl. 88—57)

This invention relates to lenses for use as erector lenses in low power telescopes and like instruments.

An object of the invention is to provide an improved erector lens which is suitable for hand telescopes and particularly for camera range finders such as described in copending patent application Serial Number 639,343, Wood, now Patent Number 2,464,166, issued March 8, 1949, and which provides a flatter image field than lens erectors heretofore used.

It has been customary in hand telescopes of the terrestrial type to use what is known as a terrestrial eyepiece consisting of an erector lens and an eyepiece lens. The erector lens receives the image formed by the objective of the telescope and relays it to the eyepiece and at the same time inverts it so that the objects viewed appear right side up. The usual erector lens consists of two positive cemented doublets and, as is well known, has a positive Petzval sum which aggravates the effect of the positive Petzval sum of the objective and eyepiece.

In some systems, such as the rangefinder shown in U. S. Patent 1,991,110 Mihalyi, a prism erector is used. This has the advantage of adding nothing to the undesirable positive Petzval sum. However, when attached to a long-bodied camera such as some well known motion picture cameras, this system is too short to reach from the front of the camera to the back, and so a lens erector is preferable in this instance.

The use of an erector lens closely resembling a standard type of photographic lens has been proposed in order to reduce the Petzval sum, and the present invention provides a particularly advantageous form of such an erector lens.

According to the present invention, an erector lens is made up consisting of a simple biconcave element spaced between two biconvex elements which has a Petzval sum substantially equal to zero and which is substantially corrected for field curvature at unit magnification so that it is usable interchangeably with a prism erector. That is to say, the same objective and eyepiece combination can be used either with the prism erector or the lens erector.

The Petzval sum is made very small and the other aberrations are best corrected over the comparatively small angular field by making the spaces, the over all length, and the powers of the three elements greater than is usual. Preferably the sum of the two airspaces is between 0.20 F and 0.32 F, the over all length is between 0.48 F and 0.62 F, where F is the equivalent focal length of the erector, and the powers $p_6$, $p_7$, and $p_8$ of the three lens elements in order are such that $F(p_6+p_8)$ is between 3.75 and 4.50 and $Fp_7$ is between $-3.50$ and $-4.25$. For the best working of the invention the Petzval sum of the erector should be less than $0.25/F$ in absolute value.

I have found that a very superior erector lens meeting these special qualifications can be made up of a simple biconcave lens element axially spaced between two biconvex elements in which the refractive indices N, dispersive indices V, radii of curvature R, axial thicknesses $t$, and axial airspaces S, each numbered by subscripts in order from front to rear are between the respective limits specified in the following algebraic inequalities:

$$1.66 < N_6 < 1.72$$
$$1.62 < N_7 < 1.68$$
$$1.66 < N_8 < 1.72$$
$$50 < V_6 < 62$$
$$26 < V_7 < 38$$
$$50 < V_8 < 62$$
$$.38\,F < R_6 < .48\,F$$
$$2.20\,F < R_7 < 3.50\,F$$
$$.30\,F < R_8 < .45\,F$$
$$.30\,F < R_9 < .45\,F$$
$$2.00\,F < R_{10} < 3.40\,F$$
$$.35\,F < -R_{11} < .45\,F$$
$$.10\,F < t_6 < .16\,F$$
$$.01\,F < t_7 < .08\,F$$
$$.10\,F < t_8 < .16\,F$$
$$.10\,F < S_5 < .18\,F$$
$$.10\,F < S_6 < .18\,F$$
$$.48\,F < O.L. < .62\,F$$

where O. L. denotes the over all length of the lens, that is the sum of all the thicknesses and spaces, and where the $+$ and $-$ signs on the radii denote surfaces respectively convex and concave to the front.

It is further preferable that $(S_5+S_6)$ be less than 0.32 F. Longer total airspaces are less advantageous in that they tend to give an inward curving image.

The accompanying drawing shows a telescopic range finder according to the invention and constructional data for one embodiment thereof.

Two bundles of rays of light from a distant object not shown enter the base prism 1 and its twin, are reflected into the objective 2, 3, and its twin. These render them convergent, they proceed to the combining prism 4 which combines them into a single bundle of rays which comes to a focus at or near the rear surface of the prism. The inverted image at this position is indicated by the dotted arrow pointing downward. The field lens 5 redirects the rays toward the erector 6, 7, 8, and the erector focuses them to form an erect image indicated by the arrow pointing upward. This image is viewed through the eyepiece 9, 10, 11, 12 in the usual way.

Ranging is accomplished by moving the objective lenses as described in the above-mentioned application by Wood.

In the table of data, the optical elements are numbered in order from front to rear in the first column. The second and third columns give the refractive index N for the D line of the spectrum and the conventional dispersive index V. The last two columns give the radii of curvature R, thicknesses $t$ and spaces S each numbered by subscripts from front to rear. The prisms, of course, have plane surfaces. The data for the objective, erector, and eyepiece are given below in the same manner as in the drawing except that, to facilitate comparison with the art, each is separately scaled up to a focal length of 100 mm.

Objective   F=100 mm.

| Element | N | V | Radii | Thicknesses |
|---|---|---|---|---|
| 2 | 1.649 | 33.8 | $R_1 = \infty$<br>$R_2 = +41.09$ mm.<br>$R_3 = -49.70$ mm. | $t_2 = 4.98$ mm.<br>$t_3 = 24.90$ mm. |
| 3 | 1.572 | 57.4 | | |

Erector, Example 1   F=100 mm.

| Element | N | V | Radii | Thicknesses |
|---|---|---|---|---|
| 6 | 1.697 | 56.1 | $R_6 = +41.39$ mm.<br>$R_7 = -248.3$<br>$R_8 = -36.41$<br>$R_9 = +36.41$<br>$R_{10} = +248.29$<br>$R_{11} = -41.39$ | $t_6 = 12.14$ mm.<br>$S_5 = 13.33$<br>$t_7 = 5.69$<br>$S_6 = 13.33$<br>$t_8 = 12.14$<br>O.L.=56.6 |
| 7 | 1.649 | 33.8 | | |
| 8 | 1.697 | 56.1 | | |

Eyepiece   F=100 mm.

| Element | N | V | Radii | Thicknesses |
|---|---|---|---|---|
| 9 | 1.649 | 33.8 | $R_{12} = +261.9$ mm.<br>$R_{13} = +88.15$<br>$R_{14} = -119.9$<br>$R_{15} = +119.9$<br>$R_{16} = -88.15$<br>$R_{17} = -261.9$ | $t_9 = 6.27$ mm.<br>$t_{10} = 29.35$<br>$S_9 = 2.53$<br>$t_{11} = 29.35$<br>$t_{12} = 6.27$ |
| 10 | 1.517 | 64.5 | | |
| 11 | 1.517 | 64.5 | | |
| 12 | 1.649 | 33.8 | | |

The base prism 1 forms the effective aperture stop of the objective. With the aperture stop thus in front of the objective, the best correction of coma is obtained by turning the objective with its plano side forward, the reverse of the usual position.

The field lens 5 should be of a suitable focal length to image the exit pupil of the objective approximately at the center of the erector. This focal length is easily determined by anyone skilled in the art. The shape of the field lens is not extremely critical. It does have a better effect on the the field curvature, however, if $R_4$ is between $\frac{1}{3} R_5$ and $R_5$ than it has if the shape is outside this range.

A slightly modified form of the erector according to the invention has data as follows:

Erector, Example 2   F=100 mm.

| Element | N | V | Radii | Thicknesses |
|---|---|---|---|---|
| 6 | 1.697 | 56.1 | $R_6 = +43.31$ mm.<br>$R_7 = -260.3$<br>$R_8 = -38.38$<br>$R_9 = +35.25$<br>$R_{10} = +239.9$<br>$R_{11} = -40.02$ | $t_6 = 12.5$ mm.<br>$S_5 = 14.0$<br>$t_7 = 5.5$<br>$S_6 = 12.9$<br>$t_8 = 11.7$<br>O.L.=56.6 |
| 7 | 1.649 | 33.8 | | |
| 8 | 1.697 | 56.1 | | |

The Petzval sums of the two examples of erector lenses are +0.0024 for Example 1 and +0.0016 for Example 2. The powers of the elements are as follows: $p_6 = p_8 = 1.93/F$ and $p_7 = 3.67/F$ for Example 1 and $p_6 = 1.84/F$, $p_7 = 3.64/F$, and $p_8 = 2.00/F$ for Example 2. It is directly evident from this data and the above tables that both examples embody all the features of the invention as above set forth. Also both give very excellent results in practice.

What I claim is:

1. An erector lens for telescopic systems consisting of a biconcave element airspaced between two biconvex elements in which the refractive indices N, the dispersive indices V, the radii of curvature R, the axial thicknesses $t$ of the elements, each category being numbered by subscripts from front to rear, are all between the respective limits specified in the following algebraic inequalities:

$$1.66 < N_6 < 1.72$$
$$1.62 < N_7 < 1.68$$
$$1.66 < N_8 < 1.72$$
$$50. < V_6 < 62.$$
$$26. < V_7 < 38.$$
$$50. < V_8 < 62.$$
$$.38\,F < R_6 < .48\,F$$
$$2.20\,F < R_7 < 3.50\,F$$
$$.30\,F < R_8 < .45\,F$$
$$.30\,F < R_9 < .45\,F$$
$$2.00\,F < R_{10} < 3.40\,F$$
$$.35\,F < R_{11} < .45\,F$$
$$.10\,F < t_6 < .16\,F$$
$$.01\,F < t_7 < .08\,F$$
$$.10\,F < t_8 < .16\,F$$
$$.10\,F < S_5 < .18\,F$$
$$.10\,F < S_6 < .18\,F$$
$$.48\,F < O.L. < .62\,F$$

where F denotes the equivalent focal length of the erector lens and O.L. denotes the overall length, that is the sum of all the thicknesses and airspaces.

2. A lens consisting of three simple airspaced elements made substantially according to the following specifications:

| Element | N | V | Radii | Thicknesses |
|---|---|---|---|---|
| 1 | 1.7 | 56 | $R_6 = +0.41\,F$<br>$R_7 = -2.5\,F$ | $t_6 = .12\,F$<br>$S_5 = .13\,F$ |
| 2 | 1.65 | 34 | $R_8 = -0.36\,F$<br>$R_9 = +0.36\,F$ | $t_7 = .06\,F$<br>$S_6 = .13\,F$ |
| 3 | 1.7 | 56 | $R_{10} = +2.5\,F$<br>$R_{11} = -0.41\,F$ | $t_8 = .12\,F$ | where F is the focal length of the lens and where the elements are designated by numbers in the first column and the corresponding refractive indices N for the D line of the spectrum and the dispersive indices V are given in the second and third columns and the radii R, thicknesses $t$ and spaces S, each numbered by subscripts from front to rear are given in the last two columns, the positive and negative radii indicating surfaces respectively convex and concave to the front.

3. A lens consisting of three simple airspaced elements made substantially according to the following specifications:

| Element | N | V | Radii | Thicknesses |
|---|---|---|---|---|
| 1 | 1.7 | 56 | $R_6 = +0.43\,F$<br>$R_7 = -2.6\,F$ | $t_6 = .12\,F$<br>$S_5 = .14\,F$ |
| 2 | 1.65 | 34 | $R_8 = -0.38\,F$<br>$R_9 = +0.35\,F$ | $t_7 = .06\,F$<br>$S_6 = .13\,F$ |
| 3 | 1.7 | 56 | $R_{10} = +2.4\,F$<br>$R_{11} = -0.40\,F$ | $t_8 = .12\,F$ | where F is the focal length of the lens and where the elements are designated by numbers in the first column and the corresponding refractive indices N for the D line of the spectrum and the dispersive indices V are given in the second and third columns and the radii R, thicknesses t and spaces S, each numbered by subscripts from front to rear are given in the last two columns, the positive and negative radii indicating surfaces respectively convex and concave to the front.

WILLIAM DONALD ORSER.

REFERENCES CITED

The following references are of record in the file of this patent:

UNITED STATES PATENTS

| Number | Name | Date |
| --- | --- | --- |
| 1,343,025 | Barr et al. | June 8, 1920 |
| 1,477,112 | Eppenstein | Dec. 11, 1923 |
| 2,298,090 | Warmisham | Oct. 6, 1942 |
| 2,391,114 | Aklin | Dec. 18, 1945 |
| 2,430,550 | Altman et al. | Nov. 11, 1947 |
| 2,453,260 | Pestrecov | Nov. 9, 1948 |
| 2,479,792 | Tackaberry | Aug. 23, 1949 |

Certificate of Correction

Patent No. 2,541,014 February 13, 1951

WILLIAM DONALD ORSER

It is hereby certified that error appears in the printed specification of the above numbered patent requiring correction as follows:

Column 2, line 20, in the table, for "2.20 $F<R_7$" read *2.20 $F<-R_7$*; line 21, same table, for ".30 $F<R_8$" read *.30 $F<-R_8$*;

and that the said Letters Patent should be read as corrected above, so that the same may conform to the record of the case in the Patent Office.

Signed and sealed this 22nd day of May, A. D. 1951.

[SEAL]

THOMAS F. MURPHY,
*Assistant Commissioner of Patents.*